Figure 1:
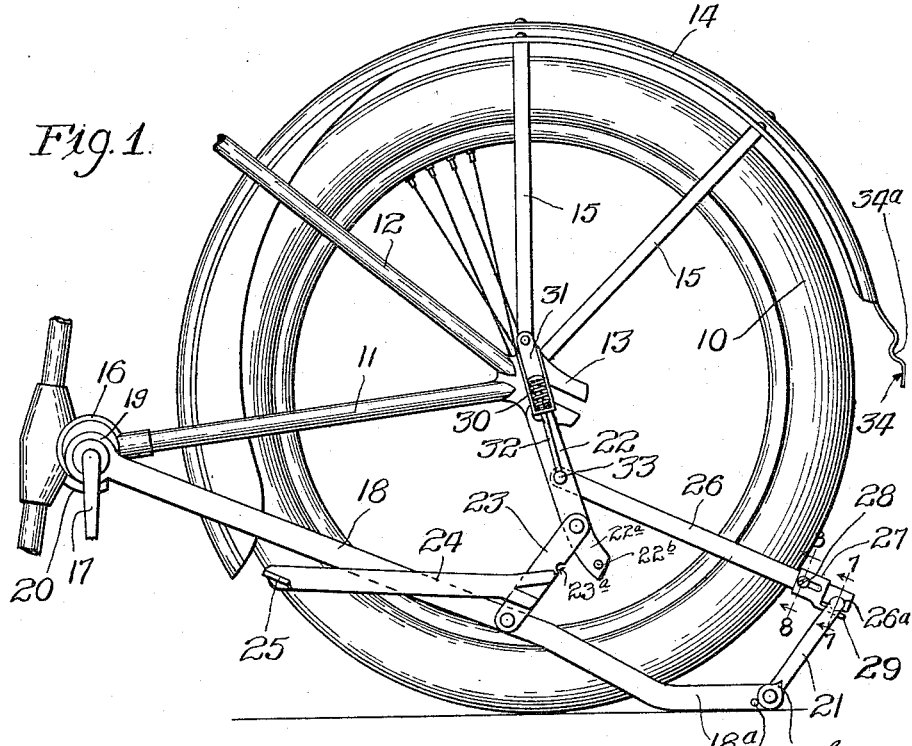

A. LEVEDAHL.
MOTOR CYCLE SUPPORT.
APPLICATION FILED MAY 2, 1914.

1,169,171.

Patented Jan. 25, 1916.
3 SHEETS—SHEET 1.

Witnesses:
Charles Poole
Maurice D. Herman

Inventor
Axel Levedahl
by Poole & Crouter
Attys.

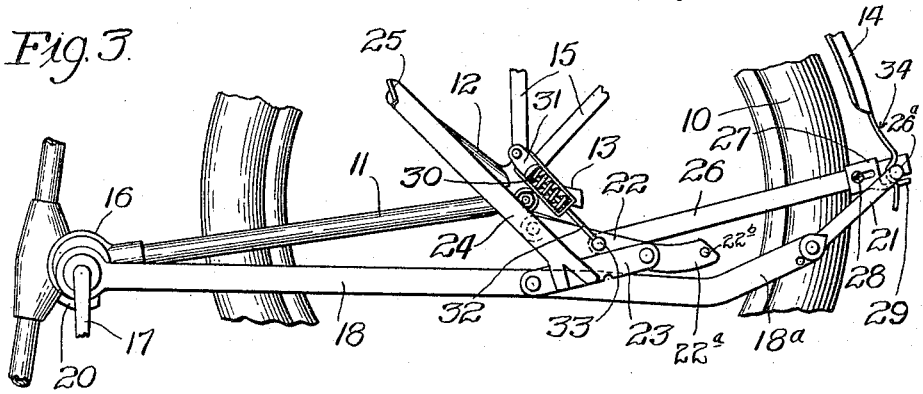
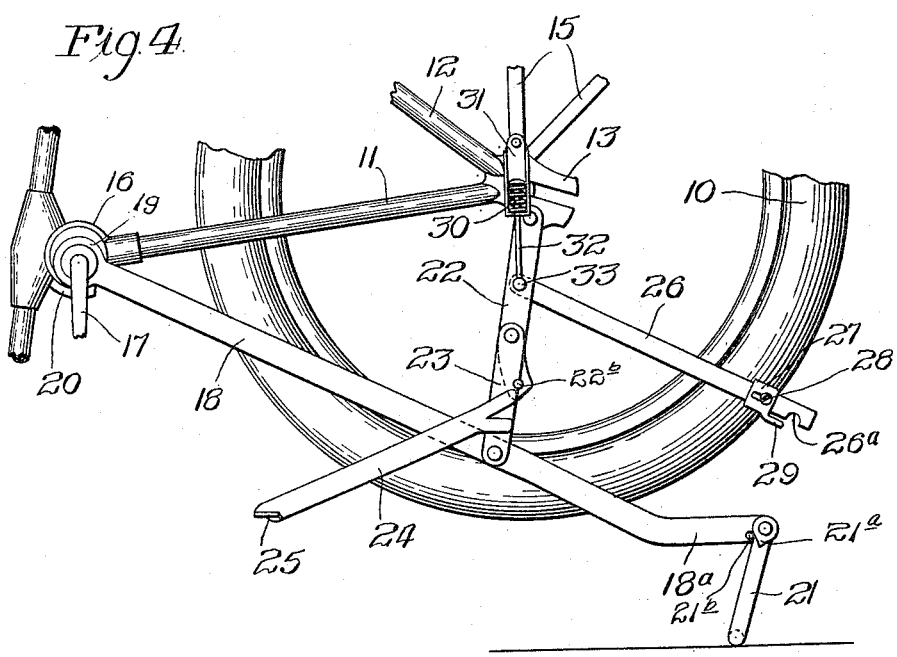

A. LEVEDAHL.
MOTOR CYCLE SUPPORT.
APPLICATION FILED MAY 2, 1914.
1,169,171.
Patented Jan. 25, 1916.
3 SHEETS—SHEET 3.
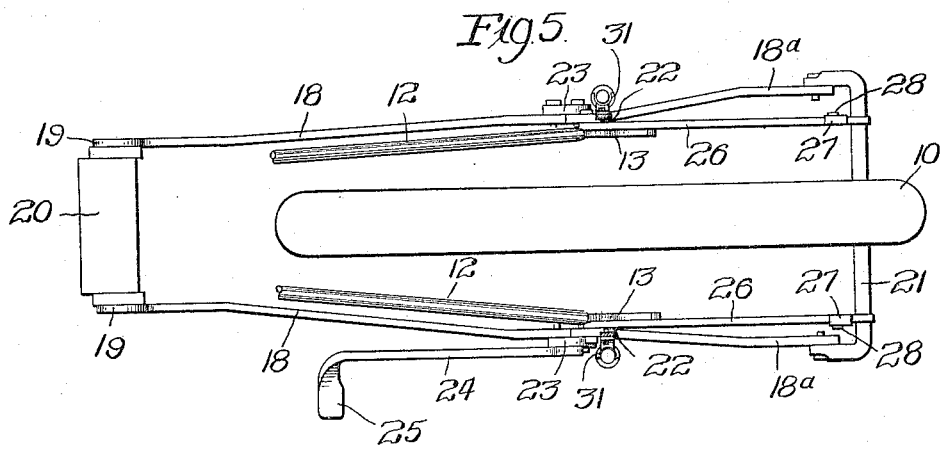
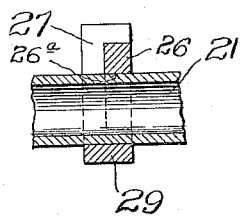
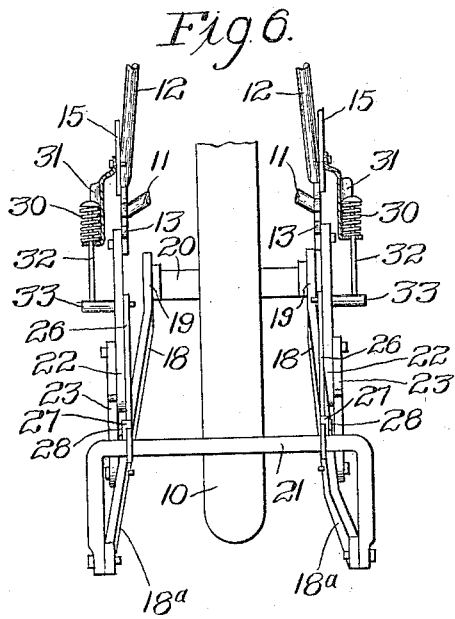
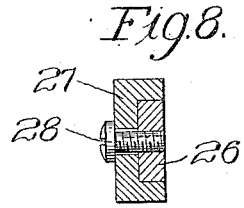
Witnesses:
Charles H Poole
Maurice D Herman
Inventor
Axel Levedahl
by Poole & Crower
Attys.

UNITED STATES PATENT OFFICE.

AXEL LEVEDAHL, OF AURORA, ILLINOIS, ASSIGNOR TO AURORA AUTOMATIC MACHINERY COMPANY, OF AURORA, ILLINOIS, A CORPORATION OF DELAWARE.

MOTOR-CYCLE SUPPORT.

1,169,171.    Specification of Letters Patent.    Patented Jan. 25, 1916.

Application filed May 2, 1914. Serial No. 835,830.

*To all whom it may concern:*

Be it known that I, AXEL LEVEDAHL, a citizen of the United States, and a resident of Aurora, in the county of Kane and State of Illinois, have invented certain new and useful Improvements in Motor-Cycle Supports; and I do hereby declare that the following is a full, clear, and exact description thereof, reference being had to the accompanying drawings, and to the letters of reference marked thereon, which form a part of this specification.

This invention relates to supporting and stabilizing devices for motor vehicles, and more particularly to devices of the character described for use upon a motorcycle, bicycle or other two-wheeled vehicle, for the purpose of supporting the same in upright position when stationary, and maintaining it upright when moving at a low rate of speed.

My invention is herein shown and described as applied to a motorcycle. Vehicles of this class are devoid of lateral stability when standing still or operating at a low rate of speed, and for that reason supporting devices have been applied to the same, the more common form of such devices consisting of a U-shaped member or stand which is pivotally connected to the vehicle frame, adjacent to the rear axle, and adapted to be swung downwardly in contact with the ground, so as to provide a support at the rear of the vehicle, adapted to bear on the ground at laterally separated points and capable of maintaining the vehicle in upright position. Devices of such kind are lifted, and maintained in a position out of contact with the ground when the vehicle is moving. To operate such supporting devices necessitates the rider dismounting from the vehicle, releasing the support by hand and raising the rear portion of the vehicle to place the support in proper position. This operation is quite difficult and inconvenient because of the weight of the vehicle and the usual unclean condition of the support. Furthermore, it is not possible to utilize a support of the kind referred to as a means for stabilizing the vehicle while running at low speed, it being necessary, as is the custom ordinarily, for the operator to use one or both or his feet for the purpose.

The features of my invention are particularly directed toward providing a form of support which is so constructed as to avoid the objectionable features present in prior forms of supports for motor vehicles, and which may be operated by the rider from his position on the seat, and which may be equally efficient as a support when the vehicle is at a standstill, or as a stabilizer when the vehicle is running at a slow rate of speed. These features together with others embody my invention, which will be readily understood as I proceed with the description of the one form of my improved device, as shown in the accompanying drawings, in which—

Figure 2:
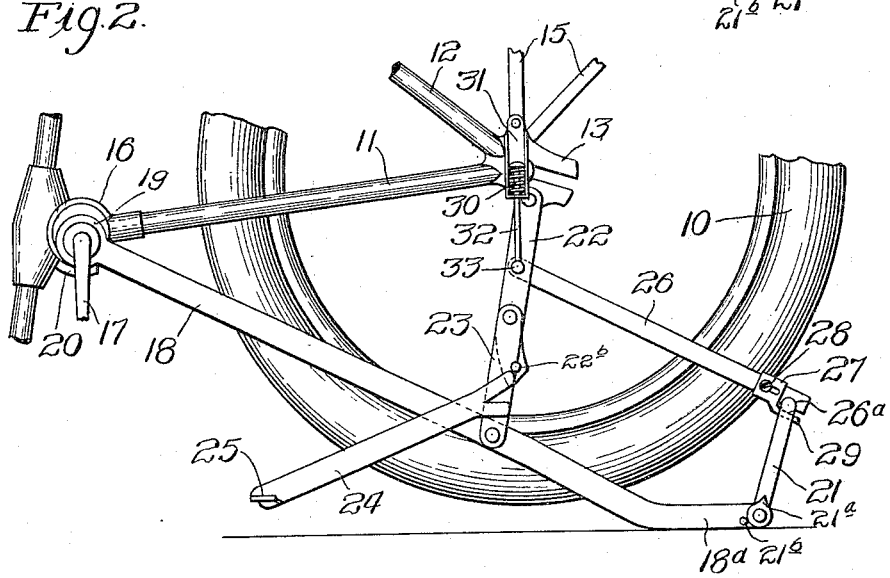

Figure 1 is a view in side elevation of the rear portion of a motor vehicle with my device attached thereto and in contact with the ground when acting as a trailer when the vehicle is in motion; Fig. 2 is a view similar to Fig. 1, showing the position of the device acting as a support when the vehicle is at a standstill; Fig. 3 is a view in side elevation, showing the device in non-operative position; Fig. 4 is a view in side elevation, showing the support in contact with the ground and parts in position when the rear wheel is raised for the purpose of making repairs; Fig. 5 is a plan view of the device, showing the position of the rear wheel; Fig. 6 is a rear view in elevation of the support shown in contact with the ground; Fig. 7 is an enlarged sectional detail view, taken on line 7—7 of Fig. 1; and Fig. 8 is also an enlarged sectional detail view, taken on line 8—8 of Fig. 1.

Referring to the drawings wherein only such portions of a motor vehicle are shown as are necessary to a full understanding of my device, the rear wheel 10 of the vehicle is mounted in the usual manner between the rear ends of the pairs of forked frame members, 11 and 12, the converging rear ends of each pair of which are joined by a forked plate 13. The axle of said wheel is mounted at its ends in the two like plates 13. Extending around the upper portion of the wheel rim is a mud guard 14, which is rigidly secured between the pairs of frame members 11 and 12, and is further supported by radially extending brace members 15, 15, rigidly attached to said plates 13. At the forward ends of the lower forked frame members 11, 11, is located a crank hanger bearing 16, which carries the crank hanger 17 in which is mounted the usual crank-shaft and its foot pedals (not shown).

Referring now more in particular to the device embodying my invention, which may be attached to a vehicle having substantially the same arrangement of parts as herein illustrated and described, the same comprises parts as follows: On each side of the vehicle frame is located a side-bar 18 (Figs. 1 and 5), pivotally connected at its forward end to the vehicle in the following manner: The bar 18 is provided on its forward end with an apertured plate or circular bearing member 19, preferably formed integral with the bar. Said member 19 is provided with an aperture of proper size to receive one end of the crank hanger 17; the latter thereby acting as a bearing upon which the bar 18 may be rotated. The forward ends of said bars 18, 18, on opposite sides of the same, are joined together by means of a rigid transverse connecting member 20, extending between the bearing members 19, 19, and immediately below the crank hanger bearing 16. In the position of the parts shown in Fig. 1, said bars 18, 18 extend downwardly and rearwardly and terminate adjacent to the rear portion of the wheel 10 and rearwardly from its point of contact with the ground. A portion of each side bar 18, adjacent to the rear end thereof, is preferably bent upwardly to a position at an angle to the forward portion thereof, to provide a runner or foot portion 18ª, 18ª; said foot portion being substantially horizontal when the side-bar members are in lowered position and adapted for contact with the ground throughout the entire length thereof. The said bar members 18, 18 are also joined at their rear ends by means of a transversely extending member or bar 21, of U-shape, having at its ends arms, at right angles to its main or transversely extending part, the ends of which arms have pivotal connection with the said bars 18, 18. The said U-shaped bar 21 is adapted to be normally held in its elevated position by means hereinafter described, but may be released and swung downwardly in a manner, and for a purpose, that will be understood as I proceed with the description of the operation of my device. Each side-bar member 18 is further connected with the vehicle by means of two levers 22 and 23, located at the side of the vehicle and adapted to swing in vertical planes. Said levers are pivotally connected together at their meeting ends, so as to form a toggle joint. The upper lever 22 of each pair is pivotally connected at its upper end with the plate 13, and the lower lever 23 is pivoted at its lower end to one of the bars 18. The rear ends of the side-bars are supported by means of said levers 22 and 23, and may be raised and lowered by the flexing of the said levers on each other. The upper lever 22 is provided at its lower extremity with an end portion 22ª extending beyond the point of pivotal connection between said lever and the lever 23, and is curved or bent rearwardly. On the lower end of said curved portion is provided a pin 22ᵇ, adapted to engage a notch 23ª formed in the rear margin of the lever 23, when the levers are substantially in line with each other. The pin and notch, therefore, act to lock the levers constituting the toggle in their extended position, and prevent the same from being flexed in any other direction than rearwardly. The lower lever 23 is pivotally connected with the bar 18, at a point substantially below the axle of the wheel 10. Rigidly fixed to one of the levers 23, preferably the lever on the left-hand side of the vehicle, is an operating lever 24. This lever extends forwardly, and is, as shown in Fig. 1, when the toggle members are flexed, substantially horizontal or parallel with the ground. The forward end of the operating lever is located adjacent to, but preferably at the rear of, the crank hanger, and is provided with a laterally extending foot-engaging projection or pedal 25. This pedal is adapted to be engaged by the foot of the driver or operator, from his position on the seat or saddle, for either depressing or lifting the operating lever. The U-shaped member or bar 21 being pivotally connected at the ends of its arms with the extremities of the side-bars 18, 18, is therefore capable of being rotated about the points of connection with said side-bars. For the purpose of maintaining said U-shaped bar in its elevated position, or with its arm extending upwardly from the rear ends of said side-bars, there are provided two arms 26, 26, one on each side of the supporting devices. These arms are pivotally connected at their forward ends with the upper levers 22, 22 of the pairs of toggle levers, preferably at points midway of the ends of said levers 22, 22.

The arms 26 extend rearwardly and have detachable engagement at their rear ends with the horizontal main part of the bar 21, adjacent to the ends thereof. The means shown for detachably connecting the arms 26, 26 with the U-shaped bar 21 is as follows: Each arm 26 is provided near its rear end with a semicircular notch 26ª (Figs. 1 and 4), adapted to be engaged by said horizontal portion of the bar 21. Mounted upon said arm, immediately forward of the notch 26ª, is a slidable holding member or clamp 27 (Fig. 8). As shown, such clamp consists of a rectangular block provided with an aperture to receive the arm, and adapted to slide endwise on said arm. This clamp is secured in movable relation to the arm by means of a clamp-screw 28, extending through a longitudinal slot 27ª in the clamp, and having screw-threaded engagement with the arm. On the said clamp 27 is an integral arm or tongue, extending rearwardly toward the end of the arm and a short distance below the same. Said tongue is adapted for contact with the transverse member 21 and acts to maintain the same in engagement with the notch 26ª of the arm, when said clamp is moved to its extreme position toward the rear end of the arm, as shown in Fig. 1. The clamp is retained in position by means of the clamp-screw 28, and is moved by loosening said screw, whereby the clamp may be shifted in a direction away from the end of the arm, as shown in Fig. 4, for the purpose of releasing said member 21. The said arms 26, which normally engage the U-shaped bar 21, not only act to support said bar in upright position, but also constitute connecting links between the bar 21 and the other members of the support, so that said bar is moved to its proper position during the movement of the several members. Furthermore these arms 26, 26, together with the U-shaped bar 21, act as a means for transmitting the power exerted upon one pair of toggle levers 22 and 23 to the like levers on the opposite side of the vehicle.

In addition to the parts already described, I also provide tension or locking devices for the purpose of aiding in the movement of, and holding from movement, the supporting device. Each of these tension devices comprises a coiled spring 30 (Figs. 1 and 6), applied between the vehicle frame and the upper lever 22 of the toggle levers, in the following manner: Pivotally connected with the machine frame, at each side of the same and at a point above the upper pivot of the lever 22, preferably by a stud secured to the bracing members 15, is a bracket 31, which extends downwardly from its pivot and is provided in its lower part with a longitudinal recess in which the spring 30 is inserted, in such manner as to bear upon the lower end of the bracket. Extending downwardly within the recess of the bracket, and surrounded by the spring, is a rod 32, having at its upper end a head adapted to bear upon the upper end of the spring. Said rod 32 is pivotally connected at its lower end, by a pivot stud or pin 33, with the lever 22 of the toggle joint at a point intermediate the ends of said lever. As a convenient construction, the stud 33 is in line with or formed by the same pivot pin as that employed to connect the arm 26 with the said lever 22. The spring 30 constantly acts upon the toggle lever 22, in a direction tending to turn or swing the same about its point of pivotal connection with the machine frame, and to carry its lower end either forwardly or rearwardly, from its central or vertical position. The bracket 31 is pivoted to the machine frame at a point above the pivotal point between the lever 22 and the plate 13, and when the said lever 22 is in its neutral position, the pivot 33 of the rod 32 stands in line with the upper pivot of the lever 22 and the pivot of the bracket 31; so that, when the said lever 22 is swung rearwardly or forwardly from such neutral position, the tension of the spring, acting on the lever 22 at a point forward or at the rear of its pivoted upper end, will tend to hold said lever with its lower end in the position to which it is moved or swung. When said lever 22 is swung forwardly, so as to bring the stop pin or stud 22ᵇ on its arm 22ª against the rear side of the lever 23, as seen in Fig. 2, the rod 32 will be forward of the upper pivot of said lever 22, and the tension of the spring will act to hold or press the said stud against the lever 23, and to hold the two levers 22 and 23 in line with each other; the stud forming a stop to prevent the flexing of the toggle members in a forward direction. When said lever 22 is swung rearwardly, far enough to carry the rod 32 to the rear of the upper pivot of the lever 22, the tension of the spring 30 will tend to flex the toggle members rearwardly, as shown in Fig. 1, and to also act on the side-bar 18, in a manner to life the same. The straightening of the toggle members is effected by the pressure of the rider's foot on the forward end of the pedal lever 24, which is rigidly attached to the lower lever or member 23 of the toggle, as hereinafter set forth. Moreover, when the lever 22 is thrown rearwardly from its central position, the springs 30 act to lift the side-bars 18, 18, and the transverse bar 21, to a non-operative position (Fig. 3), in which the transverse bar 21 is engaged by a spring clip 34 secured to the lower end of the mud guard 14. Said spring clip is provided with a recess 34ª adapted to automatically engage the horizontal portion of said bar 21, when the support is thrown upwardly by the operation and under the action of the springs 30.

Referring now to the manner of operating the device, embodying the features of my invention, and to the various functions it is capable of performing under different circumstances, Fig. 3 shows the position of the support when held in its folded or non-operative position with its rear portion securely held in its elevated position by the engagement of the bar 21 with the spring clip 34. This is the position in which the support will be carried when the vehicle is free to maintain its ordinary rate of speed under good road conditions and where frequent stops are not made by the rider. However, when the vehicle approaches slipping conditions of road or localities in which it is necessary to continue at a low rate of speed, the support is released from the spring clip 34 by a quick downward pressure upon the operating lever 24, and the support then drops to a position in which the horizontal portions 18ª of the side-bars are but a short distance above the surface of the ground. The tension of the springs 30 is then sufficient to prevent contact of the side bars with the ground. When the parts are in this position, the pedal 25 of the operating lever 24 may be pressed downwardly by the foot of the rider, and the toggle levers, still remaining flexed, may be thereby operated to give a further downward movement to the side bars 18. The device is now ready to be utilized when the speed of the machine is reduced to such an extent that it will no longer remain upright, or when there is danger of the wheels slipping upon a slippery pavement. By a graduated pressure of the foot upon the pedal 25 against the action of the springs 30, the side-bar members may be further depressed and their rear ends brought into contact with the ground with a required degree of pressure, so that they will act to prevent sidewise tipping of the vehicle; said side bars then trailing on the ground during the continuance of the forward movement of the vehicle as shown in Fig. 1. Should it be necessary to bring the vehicle to a full stop, as when the rider desires to dismount, the side-bar members may be pressed downwardly until the vehicle comes to a standstill. An increased pressure may then be applied upon the pedal so as to bring the members of the device to the position shown in Fig. 2, in which position the toggle members, in being straightened or brought into alinement, act to raise the wheel and the rear portion of the vehicle above the ground. At such time the side bars support the vehicle and the toggle levers act as rigid supporting members between said bars and the rear portion of the vehicle frame; said bars being locked from rising by the engagement of the pins 22ª and notches 23ª on the toggle members. When the rider desires to continue his progress, he may mount for the purpose of starting the engine, and when ready to proceed the rear wheel will be lowered by inserting the toe under the pedal and exerting an upward force sufficient to flex the toggle members. The support, upon being released from its load by the contact of the wheel with the ground, is then automatically carried upward to its folded position by the action of the springs 30, 30.

The support is further adapted to be used when it is desired to remove the rear wheel from its place in the frame for the purpose of making repairs or to place a new tire on the rear wheel. At such time it is desirable to raise the rear part of the vehicle considerably higher than it is normally raised by the support when acting to hold the vehicle when stationary. For this purpose the U-shaped bar 21 is utilized, and the same is operated in the following manner: The rear ends of the arms 26 are disconnected from said bar 21, in the manner before stated, thus permitting the same to be swung downwardly into position for contact with the ground. Radially extending, rigid-stop arms 21ª are provided on the pivots of the bar 21, outside of the side bars 18, in position to engage studs 21ᵇ, applied to the said bars 18, forward of said pivots, when the transverse part of the bar 21 is swung to a position below the ends of the bars 18, and slightly forward of its pivotal axis. When in this position, the bar 21 is adapted to rest on the ground, and support the rear ends of the bars 18 at a distance above the ground substantially equal to the length of the arms of said bar 21. Having lowered the side bars 18 to a position in which the toggle members are straightened, and the said bars are locked from rising, the rear of the vehicle may then be lifted by the rider and the vehicle simultaneously drawn rearwardly, whereupon the U-shaped bar is swung downward and forward until arrested by the stop-members described, when its arms will extend downward and slightly forward from their pivots, the horizontal portion of the bar then resting in contact with the ground, and supporting the side bars 18, in the manner stated.

The advantages of a supporting device, constructed in accordance with my invention, are manifold, as is apparent from the above description of its mode of operation. Except for the purpose of making repairs, the device is operated entirely by the rider when mounted on the seat, by the use of his feet, thus eliminating the inconvenience of dismounting and balancing the vehicle while lowering the support, or bringing it in position for operation. Furthermore, it provides for steadying or stabilizing the vehicle while in motion, as well as for maintaining it upright when stationary, thus removing the difficulties generally encountered in driving on congested and slippery thoroughfares, where slow speed and frequent stops are necessary. A further advantage is the ease with which the device is operated, in that the rider's weight may be utilized in raising the machine from the ground, whereas in other forms of supports the full weight of the vehicle must be lifted to place the support in proper position for holding the vehicle upright.

A device embodying the features of my invention may be variously modified in its details of construction without departing from the spirit of my invention, and for that reason I do not wish to be limited to the construction herein described and illustrated, except in so far as specifically pointed out in the appended claims.

I claim as my invention:

1. A supporting device for motor vehicles, comprising a side bar member pivotally mounted on the vehicle frame and adapted to engage the ground at its free end, and means for raising and lowering said side bar member, comprising a toggle lever pivotally connected to said vehicle frame and said side bar member, and a foot-operated lever arm rigidly attached to one of the members of the toggle lever.

2. A supporting device for motor vehicles, comprising a side bar member pivotally mounted on the vehicle frame and having its free end adapted for contact with the ground, a toggle lever consisting of pivotally connected link members connected with said vehicle frame and with said side bar member, and a foot-operated lever arm rigidly attached to one of said link members of the toggle lever for straightening said members, said link members being provided with coacting locking members acting to lock the same in straightened position.

3. A supporting device for motor vehicles, comprising a side bar member pivotally mounted on the vehicle frame and having its free end adapted for contact with the ground, a toggle lever pivotally connected with the vehicle frame and with said side bar member, a lever arm rigidly connected with one of the members of said toggle lever and adapted to receive pressure to straighten said toggle lever in one direction, and a spring connected with said vehicle frame and with the other of said members of the toggle lever, acting to flex the toggle lever in the opposite direction.

4. A supporting device for motor vehicles, comprising a side bar member pivotally mounted on the vehicle frame and having its free end adapted for contact with the ground, a toggle lever pivotally connected with the vehicle frame and with said side bar member, a lever arm rigidly connected with one of the members of said toggle lever and adapted to receive pressure to straighten said toggle lever in one direction, a spring connected with said vehicle frame and with the other of said members of the toggle lever, acting to flex the toggle lever in the opposite direction, and means for locking said members of the toggle lever in straightened position.

5. A supporting device for motor vehicles, comprising a side bar member pivotally mounted on the vehicle frame and adapted to engage the ground at its free end, and means for raising and lowering said side bar member, comprising a toggle lever pivotally mounted on said vehicle frame and said side bar member, and comprising pivotally connected link members adapted to assume an angular relation when the free end of said side bar member is substantially level with the ground, a foot-operated lever arm rigidly attached to one of the members of the toggle lever and adapted to receive downward pressure to depress said side bar member, and a spring connected with said toggle lever and the vehicle frame, acting to raise said side bar member from contact with the ground when the pressure is released from said lever arm.

6. A supporting device for motor vehicles, comprising a side bar member pivotally mounted on the vehicle frame and having its free end adapted for contact with the ground adjacent to a wheel of the vehicle, a toggle lever consisting of pivotally connected link members connected with said vehicle frame and with said side bar member, said link members being adapted to assume an angular relation when said side bar member is depressed to a position substantially level with the ground and to assume a straightened position, whereby said adjacent wheel of the vehicle is elevated from the ground, said link members being provided with coacting locking members acting to lock the toggle lever in straightened position, and means for operating said toggle lever to depress said side bar member.

7. A supporting device for motor vehicles, comprising a side bar member pivotally mounted on the vehicle frame and having its free end adapted for contact with the ground adjacent to a vehicle wheel, a toggle lever pivotally connected with the vehicle frame and with said side bar member, and comprising pivotally connected link members adapted to assume an angular relation when the free end of said side bar member is depressed to a position substantially level with the ground and to assume a straightened position, whereby said adjacent wheel is elevated from the ground, a lever arm rigidly connected with one of the link members of said toggle lever and adapted to receive pressure to straighten said toggle lever to depress said side bar member, and a spring connected with said vehicle frame and with the other of said members of the toggle lever, acting to flex the toggle lever to elevate said side bar member when the links are in angular relation, said links being provided with coacting locking members acting to lock said link members in straightened position.

8. A supporting device for motor vehicles, comprising a side bar member pivotally mounted on the vehicle frame and having its free end adapted for contact with the ground adjacent to a vehicle wheel, a toggle lever pivotally connected with the vehicle frame and with said side bar member, a foot-operated lever arm rigidly connected with one of the members of said toggle lever and adapted to receive pressure to bring said toggle lever into straightened position in which position the side bar member is depressed to effect the elevation of one end of the vehicle from the ground, said toggle lever being provided with coacting locking members acting to transform the same into a substantially vertical and rigid supporting member when said toggle lever is in straightened position.

9. A supporting device for motor vehicles, comprising side-bar members pivotally connected, each at one of its ends, with the vehicle frame, and adapted to engage the ground at their free ends, a transverse bar connecting the free ends of said side-bar members, toggle levers connected with the vehicle frame and with the side-bar members intermediate their ends, an operating lever attached to one of said toggle levers, means for locking said toggle levers from flexure, when said side-bar members are depressed, and tension means acting on said toggle levers to lift said side-bar members when the toggle levers are flexed.

10. A supporting device for two-wheeled vehicles, comprising connected side bars mounted on opposite sides of the vehicle, and pivotally connected, each at its forward end, with the vehicle frame intermediate the front and rear wheels, said side bars being extended rearwardly of the axle of the rear wheel, a pair of toggle levers at each side of the vehicle, one member of each pair being pivotally connected with the vehicle frame adjacent to the axle of the rear wheel, and the other member of each pair being pivotally connected with one of the side-bar members intermediate its ends, and an operating lever connected with one of said toggle levers.

11. A supporting device for motor vehicles, comprising side bars pivotally mounted on opposite sides of the vehicle frame, means for elevating and depressing the swinging ends of said side-bar members, comprising pairs of toggle levers, each pair pivotally connected with the vehicle frame and one of said side bars, springs acting on said toggle levers in a direction to flex the same, means for locking said toggle levers in straightened position, means rigidly connecting said side bars with each other, and an operating lever rigidly connected with one of said toggle levers.

12. A supporting device for motor vehicles, comprising side-bar members, each pivotally connected at one end with the vehicle frame, means for actuating said side-bar members, comprising pairs of toggle levers, each pair being pivotally connected with the vehicle frame and with one of the side-bar members intermediate the ends thereof, one of said levers being provided with a stop adapted to engage the other of said levers, when said pair of levers are in longitudinal alinement, an operating lever rigidly mounted on one of said levers, and tension means connected with said vehicle frame and with said toggle levers, and acting to lift said side-bar members when the toggle levers are flexed, and to also hold the said pairs of toggle levers in longitudinal alinement.

13. A supporting device for two-wheeled vehicles, comprising supporting members movably connected with the vehicle frame at opposite sides of the same, with their rear ends at the rear of the axis of the rear wheel of the vehicle toggle levers connecting the vehicle frame and said supporting members, means for locking the said members in depressed position, a U-shaped bar extending transversely between, and pivoted at the ends of its arms to, the rear ends of said members, and means detachably connected with said U-shaped bar, acting to hold the same in its elevated position.

14. A supporting device for vehicles, comprising side bars pivotally connected at their forward ends with the machine frame at opposite sides of the same, two pairs of toggle levers, one lever of each pair being pivotally connected with said frame, and the other lever of each pair being pivoted to the side bars between the ends of the latter, a U-shaped bar extending between, and pivoted at the ends of its arms to, the rear ends of said side bars, and arms pivoted to one of the toggle levers of each pair at their forward ends and having detachable connection at their rear ends with the said U-shaped bar.

15. A supporting device for two-wheeled vehicles, comprising side bars, each journaled at its forward end upon the crank hanger of the vehicle, and extending rearwardly therefrom, a U-shaped bar pivotally connected, at the ends of its arms, with the rear ends of said side bars, toggle levers connecting the vehicle frame and said side-bars intermediate the ends of the latter, means for locking said side bars in their depressed position, and means for detachably connecting said U-shaped bar with the machine frame when the side bars are elevated.

16. A supporting device for motor vehicles, comprising side bars pivotally connected at their forward ends with the vehicle frame, a transverse, U-shaped bar pivotally connected at the ends of its arms with the rear ends of said side bars, pairs of toggle levers located at opposite sides of the frame, each having an upper member that is pivotally connected with the vehicle frame and a lower member that is pivoted to one of the side bars intermediate the ends of the latter, two vertically swinging arms, each pivotally connected at its forward end with the upper member of one pair of toggle levers, and at its rear end with said U-shaped bar, and an operating lever located at one side of the frame, and acting on one pair of said toggle levers; said transverse bar and arms serving to transmit motion from one of such pairs of toggle levers to the other.

17. A supporting device for motor vehicles, comprising side bars pivotally connected at their forward ends with the vehicle frame, and provided at such forward ends with a rigid, transverse connecting member, a transverse, U-shaped bar pivotally connected at the ends of its arms with the rear ends of said side bars, vertically swinging arms connected with the vehicle frame at their forward ends and with said U-shaped bar at their rear ends, toggle levers connecting the vehicle frame and said side-bars, and means acting on said toggle levers for elevating and depressing the said side bars.

18. A supporting device for motor vehicles, comprising side bars pivotally connected at their forward ends with the vehicle frame, toggle levers connecting the vehicle-frame with said side-bars intermediate the ends of the latter, a transverse, U-shaped bar pivotally connected at the ends of its arms with the rear ends of said side bars, means for locking said side bars in their depressed positions, arms pivotally connected with the vehicle frame at their forward ends, and detachably connected with said U-shaped bar at their rear ends, and stops for limiting the forward swinging movement of said U-shaped bar when swung downwardly and forwardly to a position below the rear ends of the side bars.

19. A supporting device for motor vehicles, comprising side bars pivotally connected at their forward ends with the vehicle frame, toggle levers pivoted at their upper ends to the vehicle frame and at their lower ends to said side bars, an operating lever connected with said toggle levers, means for locking said toggle levers in position to hold the side bars from rising, a transverse, U-shaped bar, pivoted at the ends of its arms to the rear ends of said side bars, means detachably engaging said U-shaped bar, for holding the same in its elevated position, and means for limiting the swinging movement of said U-shaped bar when swung to a position below the rear ends of the side bars.

20. A combined stabilizing and supporting device for vehicles, comprising side bars pivotally mounted on the vehicle frame at opposite sides of a vehicle wheel, and adapted for contact with the ground at their free ends, toggle levers connected with the vehicle frame and said side bars, operating means operable by the driver acting to straighten said toggle levers to depress the free ends of said side bars into a position substantially level with the ground, said side bars in such position acting as a stabilizing device for the vehicle, and said operating means being adapted to further flex the toggle levers to straightened position, thereby raising the vehicle wheel out of contact with the ground, in which position said side bars act as a supporting device for said vehicle.

In testimony, that I, claim the foregoing as my invention I affix my signature in the presence of two witnesses, this 29th day of April, A. D. 1914.

AXEL LEVEDAHL.

Witnesses:
 H. B. NEILSON,
 SIMON FLORRHEIM.

Copies of this patent may be obtained for five cents each, by addressing the "Commissioner of Patents, Washington, D. C."